D. REED.
SAFETY BRIDLE.
APPLICATION FILED DEC. 13, 1909.

982,159.

Patented Jan. 17, 1911.

Witnesses

Inventor
D. Reed
Attorneys

UNITED STATES PATENT OFFICE.

DAVID REED, OF DEWITTVILLE, NEW YORK.

SAFETY-BRIDLE.

982,159.  Specification of Letters Patent.  Patented Jan. 17, 1911.

Application filed December 13, 1909. Serial No. 532,838.

*To all whom it may concern:*

Be it known that I, DAVID REED, a citizen of the United States, residing at Dewittville, in the county of Chautauqua and State of New York, have invented certain new and useful Improvements in Safety-Bridles, of which the following is a specification.

This invention relates to new and novel improvements in harness and more particularly to bridles wherein provision is made for handling and controlling fractious horses.

It contemplates the construction of an attachment for bridles which may be readily applied to bridles of any type and character, and which may also be attached and detached to the reins at will.

Figure 1:
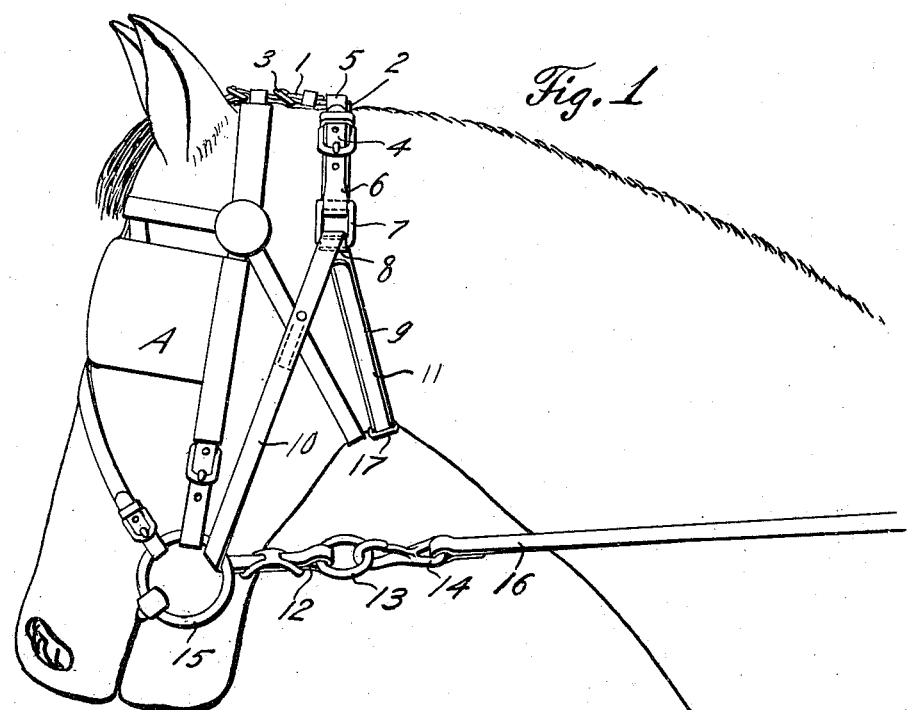
Figure 2:
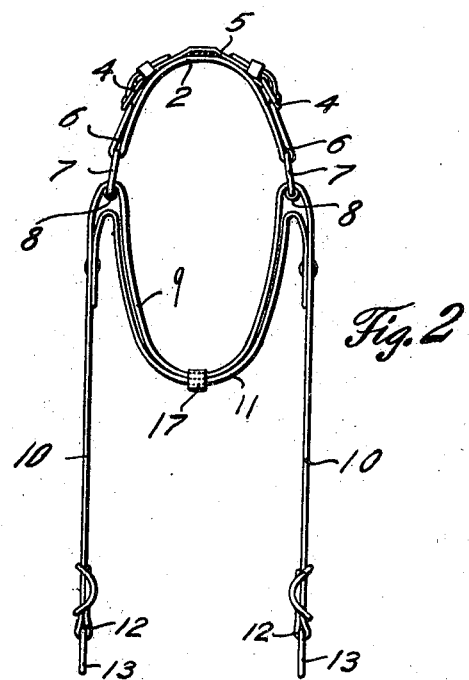

With the above and other objects in view this invention consists of the construction, combination and arrangement of parts all as hereinafter more fully described, claimed and illustrated in the accompanying drawings, wherein:

Figure 1 is a side elevation of a horse's head provided with the present invention and Fig. 2 is a front elevation of the attachment.

Reference being had to the drawings, A indicates a bridle constructed in the usual manner having a strap 1 located on the head-stall of the bridle between the ears of the horse.

The attachment forming the subject-matter of the present invention comprises a strap 2 located on the horse's neck to the rear of the ears, said strap being provided with a buckle 3 adapted to receive the strap carried by the head-stall of the bridle. The strap 2 is looped upon itself at its extremities, and the terminals thereof are secured in the buckles 4 carried by the reinforcing strip of leather 5 on each side of the buckle 3. In this manner the adjustable loops 6 are formed and consequently provide a means of carrying the links 7, said links having formed on the lower side thereof the rollers 8. A strap 9 is looped under the horse's neck and through the links 7 in such a manner that the terminals 10 thereof extend in a downward direction approximately parallel to the head-stall. In order to supply a means whereby this strap may be permanently secured to the links 7 a limiting strap 11 is secured thereto on each side of the links and is provided with the keeper 17 embracing both the strap 9 and the said limiting strap. In this manner the provision of the loops 6 supplies a means whereby the attachment is adjustable to all sizes of horses, and a means of limiting the motion of the strap 9. The terminals 10 of the strap 9 have the loops 12 formed thereby in the usual manner engaging the rings 13. Through the medium of these rings, the reins 16 are secured to the attachment through the instrumentality of the snap hooks 14 carried thereby.

In operation, the attachment is placed on the horse's head, the neck of the animal being engaged in the loop formed between the strap 9 and the strap 2. The terminals 10 of the strap 9 are then moved inwardly through the bit rings 15, after which they are engaged by the reins 16. Thus, it will be seen that when the horse becomes fractious, a very hard pressure brought to bear upon the reins will cause the terminals 10 of the strap 9 to be drawn through the bit rings 15, and as a result cause a pressure to be exerted on the horse's throat, which when continued will choke the animal and cause him to quiet. However, during the ordinary course of driving the strap 10 does not extend entirely through the ring 15, and as a result the ordinary pressure applied to the reins in the course of driving the animal would not cause him to be in any way annoyed by the attachment.

Having thus described my invention, what is claimed as new is:

In a device of the class described, the combination with a bridle, of an attachment comprising a supporting strap, said supporting strap adapted to rest on the back of the animal's neck, a connection between said supporting strap and said bridle, loops formed at the ends of said supporting strap, links carried by said loops, a choking strap adapted to pass through said links under the animal's neck and through the bit rings of the bridle, and a limiting strap secured to said choking strap on the opposite sides of said links and centrally secured to said choking strap.

In testimony whereof I affix my signature in presence of two witnesses.

DAVID REED.

Witnesses:
DANA H. BAIRD,
EUGENE LINK.